United States Patent
Kim et al.

(10) Patent No.: US 11,239,925 B2
(45) Date of Patent: Feb. 1, 2022

(54) METHOD FOR PERFORMING BEAM MEASUREMENT IN WIRELESS COMMUNICATION SYSTEM AND DEVICE THEREFOR

(71) Applicant: LG ELECTRONICS INC., Seoul (KR)

(72) Inventors: Heejin Kim, Seoul (KR); Ilmu Byun, Seoul (KR); Jiwon Kang, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 139 days.

(21) Appl. No.: 16/486,142

(22) PCT Filed: Feb. 15, 2017

(86) PCT No.: PCT/KR2017/001629
§ 371 (c)(1),
(2) Date: Aug. 14, 2019

(87) PCT Pub. No.: WO2018/151341
PCT Pub. Date: Aug. 23, 2018

(65) Prior Publication Data
US 2019/0356398 A1    Nov. 21, 2019

(51) Int. Cl.
*H04B 7/06* (2006.01)
*H04B 17/24* (2015.01)
*H04W 24/08* (2009.01)

(52) U.S. Cl.
CPC ............ *H04B 17/24* (2015.01); *H04W 24/08* (2013.01)

(58) Field of Classification Search
CPC .... H04B 7/0695; H04B 7/088; H04B 7/0617; H04B 7/0408; H04B 17/24; H04W 24/08; H04W 72/046; H04W 24/10; H04W 16/28
See application file for complete search history.

(56) References Cited

U.S. PATENT DOCUMENTS

| 2013/0072243 A1 | 3/2013 | Yu et al. |
| 2013/0235742 A1 | 9/2013 | Josiam et al. |

(Continued)

FOREIGN PATENT DOCUMENTS

| KR | 1020150105710 | 9/2015 |
| WO | 2014074894 | 5/2014 |

OTHER PUBLICATIONS

PCT International Application No. PCT/KR2017/001629, International Search Report dated Nov. 9, 2017, 3 pages.

(Continued)

*Primary Examiner* — Shukri Taha
(74) *Attorney, Agent, or Firm* — Lee Hong Degerman Kang Waimey

(57) ABSTRACT

The present invention provides a method for performing beam measurement in a wireless communication system, and a device for the method. Particularly, a method for a terminal to perform beam measurement in a wireless communication system may comprise: a step of receiving a plurality of reference signals corresponding to a plurality of transmission beams; a step of identifying at least one first transmission beam corresponding to at least one first reception beam included in a first reception beam group, on the basis of measurement performed on the first reception beam group by using the plurality of reference signals; a step of identifying at least one second transmission beam corresponding to at least one second reception beam included in a second reception beam group, on the basis of measurement (Continued)

performed on the second beam group by using the plurality of reference signals; and a step of reporting, to a base station, an index of the identified at least one first transmission beam and an index of the identified at least one second transmission beam, respectively.

11 Claims, 15 Drawing Sheets

(56) References Cited

U.S. PATENT DOCUMENTS

| | | | |
|---|---|---|---|
| 2014/0112269 A1* | 4/2014 | Yu | H04L 5/0035 370/329 |
| 2015/0257073 A1* | 9/2015 | Park | H04B 7/0408 370/331 |
| 2015/0282122 A1 | 10/2015 | Kim | |
| 2018/0248601 A1* | 8/2018 | Kishiyama | H04B 7/0636 |
| 2019/0356398 A1* | 11/2019 | Kim | H04W 24/08 |
| 2020/0145079 A1* | 5/2020 | Marinier | H04B 7/0456 |

OTHER PUBLICATIONS

Nokia, et al., "On beam grouping reporting in NR", 3GPP TSG RAN WG1 Meeting #88, R1-1703160, Feb. 2017, 9 pages.

* cited by examiner

METHOD FOR PERFORMING BEAM MEASUREMENT IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/001629, filed on Feb. 15, 2017, the contents of which are all hereby incorporated by reference herein in its entirety.

TECHNICAL FIELD

The present invention relates to a wireless communication system and, more particularly, to a method for performing a beam measurement between a transmission device and a reception device and a device for supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

For improving MIMO performance, it has been considered a method for a plurality of signal reception devices (e.g., multiple antenna devices or multiple panels) being installed in a User Equipment in distributed manner.

At this time, the plurality of signal reception devices may support different reception signal qualities, respectively, according to hardware or software configuration (e.g., difference of antenna gains and/or beam patterns).

Accordingly, in order for a User Equipment to receive a signal efficiently, a problem may be caused that different transmission and reception beam combination is requested for each signal reception device.

To solve the problem described above, the present invention proposes a method for a User Equipment to perform a measurement report for a transmission and reception beam for each reception beam group for a base station in a wireless communication system.

Particularly, the present invention proposes a method for grouping reception (Rx) beams supported by a User Equipment by using a property of beam measured using a reference signal, a directionality of a beam, and/or configuration information received from a base station.

In addition, the present invention proposes a method for reporting a transmission (Tx) beam index and/or a reception (Rx) beam index by a User Equipment for each reception beam group which is determined according to the grouping.

Furthermore, the present invention proposes a method for a User Equipment to measure the reception signal for each Rx beam group by using a reception signal such as a reference signal and to report the measurement result to a base station.

Technical objects to be achieved by the present invention are not limited to the aforementioned technical objects, and other technical objects not described above may be evidently understood by a person having ordinary skill in the art to which the present invention pertains from the following description.

Technical Solution

In an aspect of the present invention, a method for performing a beam measurement in a wireless communication system, the method performed by a User Equipment includes receiving a plurality of reference signals corresponding to a plurality of transmission (Tx) beams, identifying at least one first Tx beam corresponding to at least one first reception (Rx) beam that belongs to a first reception (Rx) beam group based on a measurement performed for the first Rx beam group using the plurality of reference signals, identifying at least one second Tx beam corresponding to at least one second Rx beam that belongs to a second Rx beam group based on a measurement performed for the second Rx beam group using the plurality of reference signals, and reporting each of an index of the identified at least one first Tx beam and an index of the identified at least one second Tx beam to a base station.

In addition, preferably, the step of reporting each of an index of the identified at least one first Tx beam and an index of the identified at least one second Tx beam to a base station may include: reporting at least one first index pair including the index of the at least one first Tx beam and the index of the at least one first Rx beam, and reporting at least one second index pair including the index of the at least one second Tx beam and the index of the at least one second Rx beam.

In addition, preferably, each of the number of the indexes of the at least one first Tx beam and the number of the indexes of the at least one second Tx beam may be determined based on configuration information received through a higher layer signaling from the base station.

In addition, preferably, the index of the at least one first Tx beam and the index of the at least one second Tx beam may be periodically reported based on reporting period configuration information received from the base station.

In addition, preferably, the index of the at least one first Tx beam and the index of the at least one second Tx beam may be aperiodically reported based on a predefined event.

In addition, preferably, the method may further include reporting, to the base station, information indicating a priority for at least one of the first Rx beam group or the second Rx beam group.

In addition, preferably, the priority may be determined based on at least one of Signal-to-Noise Ratio (SNR) or Signal-to-Interference-plus-Noise Ratio (SINR).

In addition, preferably, the method may further include reporting first Reference Signal Received Power (RSRP) information measured for the first Rx beam group to the base station and reporting second RSRP information measured for the second Rx beam group to the base station.

In addition, preferably, the first RSRP information may include the number of antenna ports used for RSRP measurement for the first Rx beam group, and the second RSRP information may include the number of antenna ports used for RSRP measurement for the second Rx beam group.

In addition, preferably, the first Rx beam group and the second Rx beam group may be determined among a plurality of Rx beams based on information for a channel property or a beam direction measured in the User Equipment.

In addition, preferably, the first Rx beam group and the second Rx beam group may be determined based on beam group configuration information received through the higher layer signaling from the base station.

In another aspect of the present invention, a User Equipment for performing a beam measurement in a wireless communication system includes a transmitting/receiving unit for transmitting and receiving a radio signal and a processor functionally connected to the transmitting/receiving unit, wherein the processor is configured to: receive a plurality of reference signals corresponding to a plurality of transmission (Tx) beams, identify at least one first Tx beam corresponding to at least one first reception (Rx) beam that belongs to a first reception (Rx) beam group based on a measurement performed for the first Rx beam group using the plurality of reference signals, identify at least one second Tx beam corresponding to at least one second Rx beam that belongs to a second Rx beam group based on a measurement performed for the second Rx beam group using the plurality of reference signals, and report each of an index of the identified at least one first Tx beam and an index of the identified at least one second Tx beam to a base station.

Advantageous Effects

According to the present invention, a User Equipment may group reception beams and determine an optimal beam combination (transmission beam and reception beam) for each reception beam group, not for all reception beams.

In addition, since an index of transmission beam and/or an index of reception beam is reported for each reception beam group, even in the case that a beam (or beam group) of a specific direction supported by a User Equipment is unusable, a User Equipment may transmit and receive a signal using a beam of different direction without delay. That is, according to the present invention, a quality of reception signal of a User Equipment may be improved.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings included as part of the detailed description in order to help understanding of the present invention provide embodiments of the present invention, and describe the technical characteristics of the present invention along with the detailed description.

MODE FOR INVENTION

Figure 1:
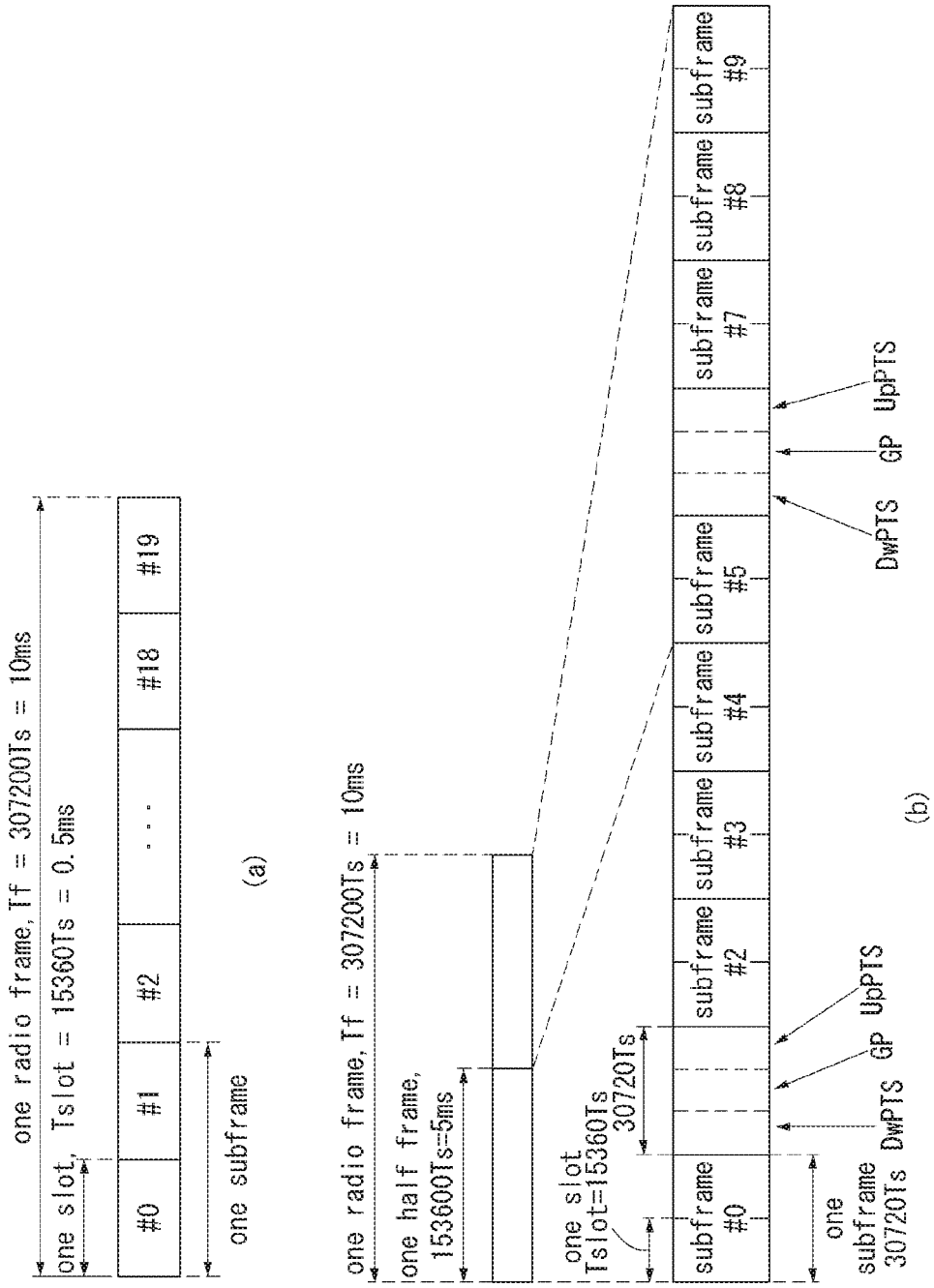
FIG. 1 illustrates the structure of a radio frame in a wireless communication system to which the present invention may be applied.

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_{slot}=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure.

The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

Figure 2:
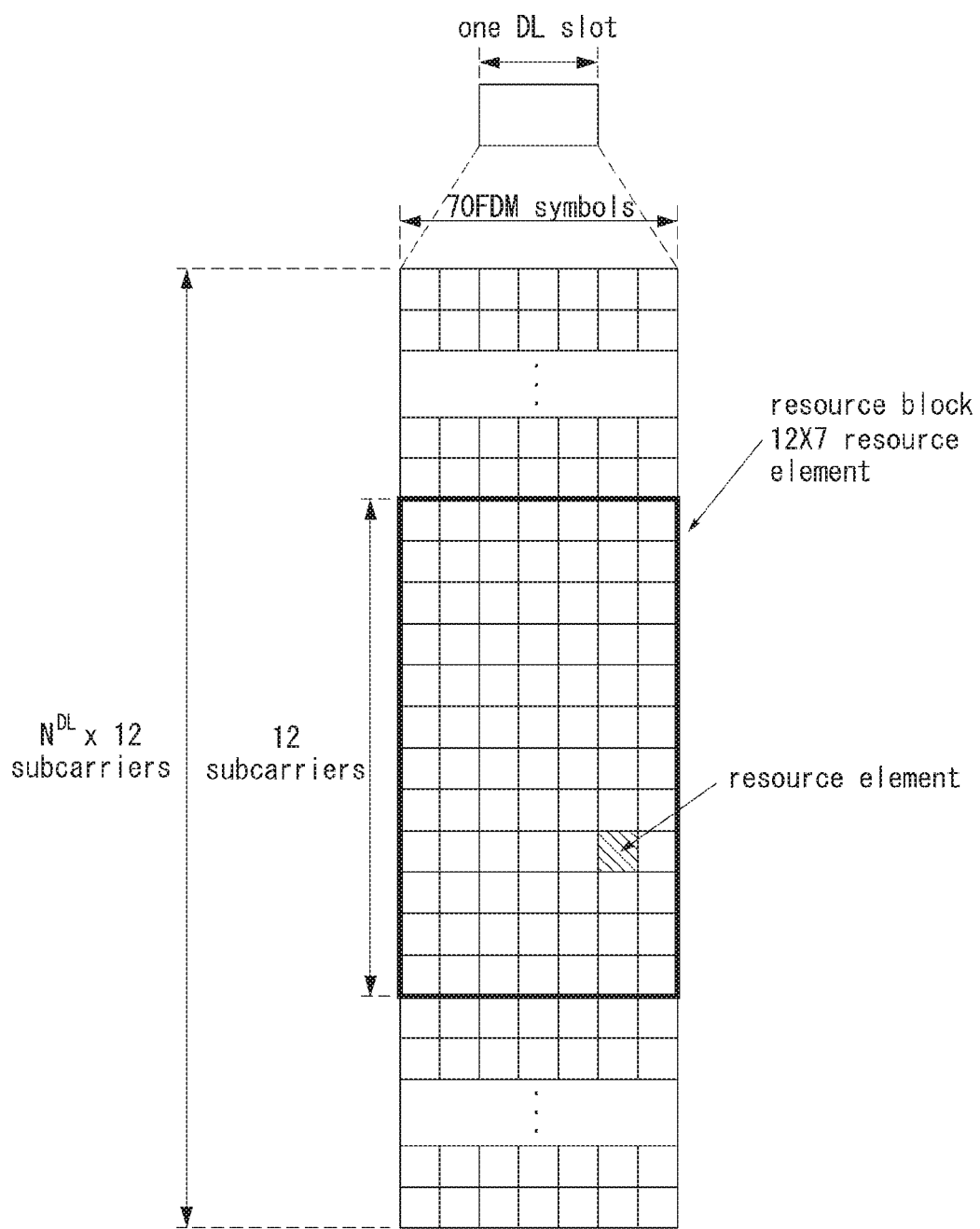
FIG. 2 is a diagram illustrating a resource grid for one downlink slot in a wireless communication system to which the present invention may be applied.

Referring to FIG. 2, one downlink slot includes the plurality of OFDM symbols in the time domain. Herein, it is exemplarily described that one downlink slot includes 7 OFDM symbols and one resource block includes 12 sub-carriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
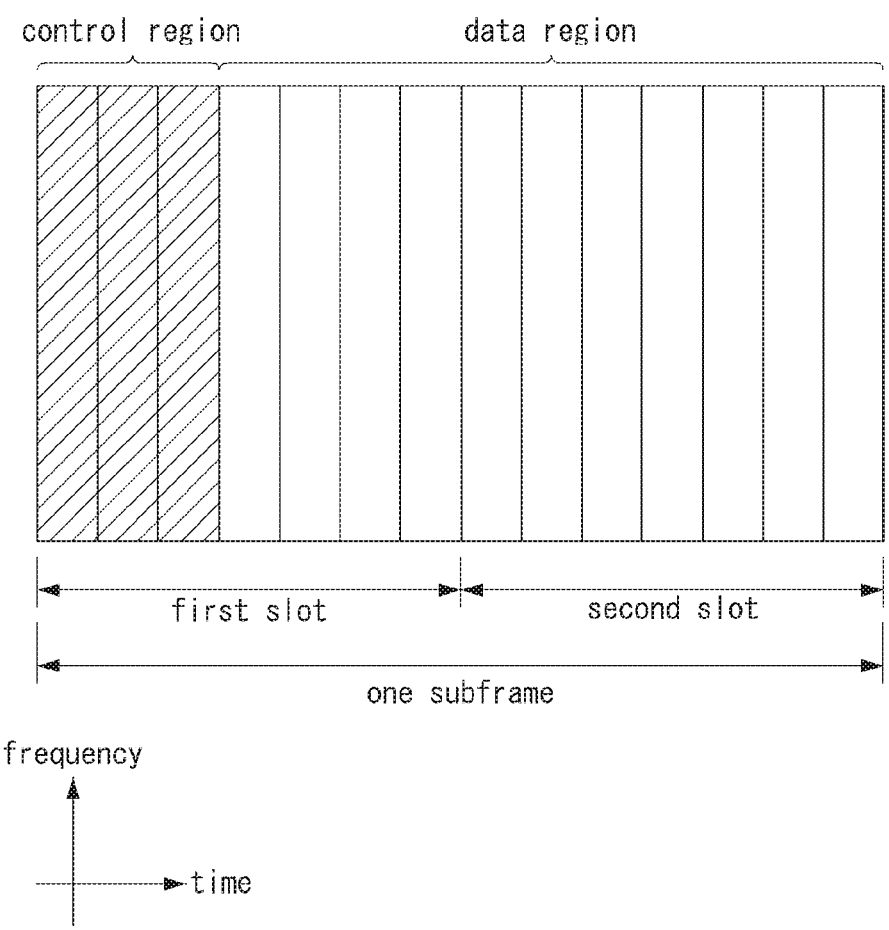
FIG. 3 illustrates the structure of a downlink subframe in a wireless communication system to which the present invention may be applied.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPCCH by merging different numbers of ECCEs. The EPCCH may use localized transmission or distributed transmission, which may result in different mapping of the ECCE to the REs in the PRB.

Figure 4:
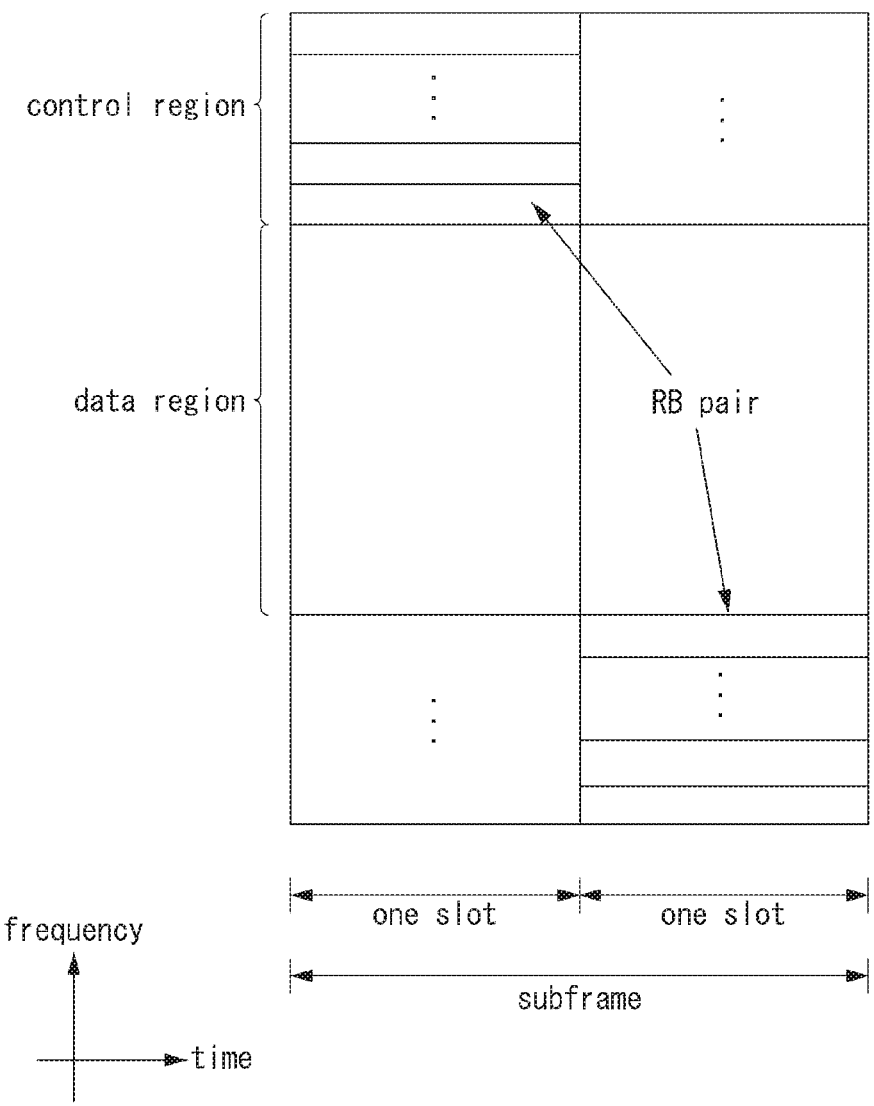
FIG. 4 illustrates the structure of an uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

UE-Side Antenna Structure

In a next generation wireless communication system (hereinafter, referred to as New Radio (NR) access system, for the convenience of description), it is required to consider a new antenna structure of a base station (eNodeB, eNB) and/or a User Equipment (terminal).

More particularly, it may be considered a method of disposing a plurality of antennas having directivity in a rectangular panel array structure.

Figure 5:
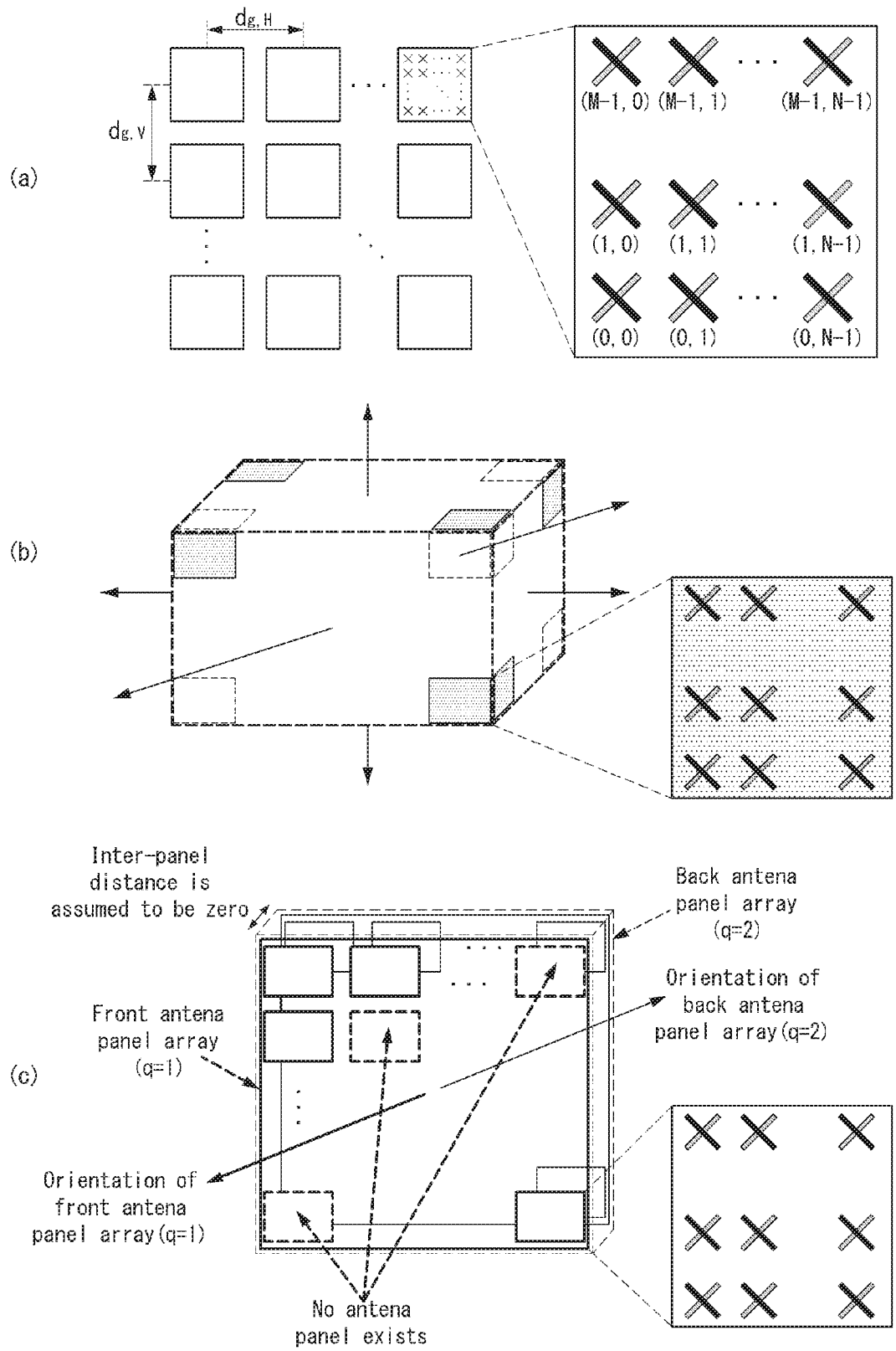
FIG. 5 illustrates example of antenna structures according to various embodiments of the present invention.

FIG. 5 illustrates example of antenna structures according to various embodiments of the present invention. FIG. 5 is shown just for the convenience of description but does not limit the scope of the present invention.

Here, (a) of FIG. 5 shows an antenna structure in which a plurality of panels of rectangular shape having 2-dimensional (2D) antenna structure is disposed.

In this case, the antenna structure shown in (a) of FIG. 5 may be referred to as a multi-panel structure.

In addition, in relation to this, an issue of securing robustness of performance and an implementation issue may be considered even in a UE-side as well as transmit-Receive Point (TRP)-side.

Accordingly, the antenna panel array of a cube shape shown in (b) of FIG. 5 and the bi-directional panel array shown in (c) of FIG. 5 may be considered as an antenna structure of UE-side.

Here, the antenna structure shown in (b) of FIG. 5 and/or (c) of FIG. 5 may mean 3D antenna structure.

Meanwhile, as the frequency for a user (or UE) to use a wireless communication increases and the range of service in which a wireless communication is utilized increases, different from the existing case (e.g., legacy LTE), it is required to support high data rate and high Quality of Service (QoS) to a user moving in high speed.

For example, in the case that a plurality of users using a public transportation wants watching multi-media on board, a mobile communication system should be able to support a high-quality wireless service to the users.

For another example, even in the case that a plurality of passengers boarding on a personal vehicle that drives on a highway uses different wireless communication services, a mobile communication system should be able to support a high-quality wireless service to the users.

Accordingly, it is required that a mobile communication network is improved to high level or a new system is designed to support the service described above not influencing on a network infrastructure.

In order to support the service described above, a vehicle Multiple-Input Multiple-Output (MIMO) system may be considered, which support a mobile communication service by installing a large size antenna array on a vehicle.

More particularly, the vehicle MIMO system may mean a system that the vehicle is supported with a high-quality service even in high-speed moving situation through large array gain, and then, a central processing unit of the vehicle supported with the service relays the received data to the UEs mounted on the vehicle.

According to the vehicle MIMO system, a communication performance degradation by a penetration loss having an average value of about 20 dB may be prevented.

In addition, multiple Rx antennas are used in comparison with a personal mobile communication device (e.g., UE, terminal, etc.), large array gain may be secured.

Furthermore, since securing distance between Rx antennas is easy, the Rx diversity may be easily secured.

Based on the description above, the vehicle MIMO system may provide good communication service to users in comparison with a personal mobile device without additional investment for the existing network infrastructure.

However, although the advantages described above, it is not easy to install large antenna array outside of a vehicle.

This is because a vehicle is an equipment of significantly high price in comparison with a personal mobile communication device, and an equipment that should satisfy many requirements such as a design concept, an aerodynamic structure, and the like in addition to the communication performance.

Accordingly, in order to solve a spatial restriction for a vehicle installation of the large antenna array, a vehicle installation of a distributed antenna array system is considered.

Here, the distributed antenna array system may mean an arrayed antenna system which is implemented through multiple arrays, not a single array.

Figure 6:
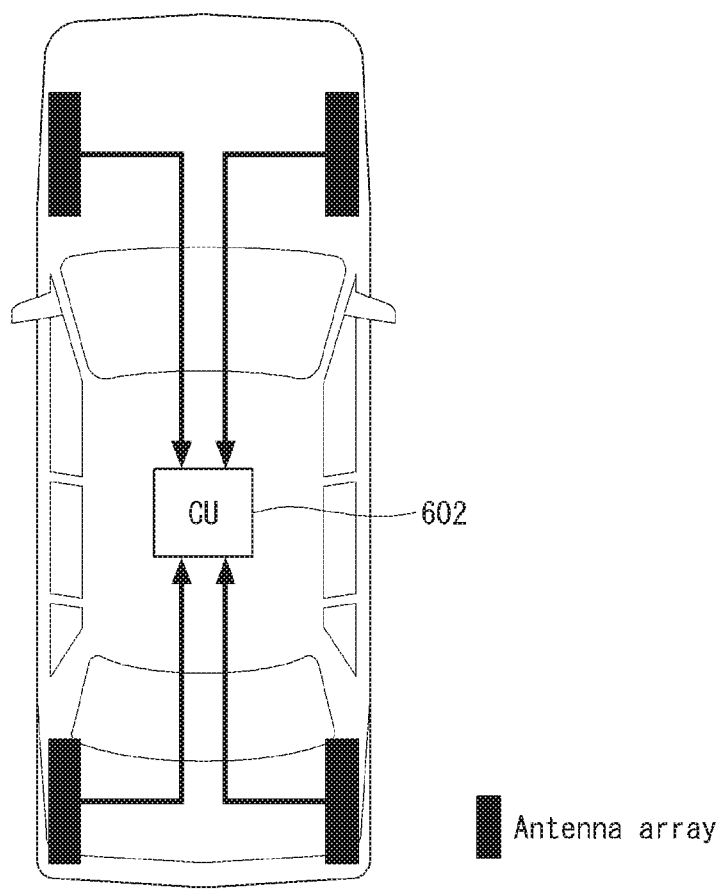
FIG. 6 illustrates an example of a distributed antenna array for a vehicle according to various embodiments of the present invention.

FIG. 6 illustrates an example of a distributed antenna array for a vehicle according to various embodiments of the present invention. FIG. 6 is shown just for the convenience of description but does not limit the scope of the present invention.

In FIG. 6, due to the property of vehicle body made of metal, the transmission and reception power performance may be improved as the antenna is disposed on an upper part of the body, but the transmission and reception power performance may be degraded as the antenna is disposed on a lower part of the body.

Accordingly, in the case that antennas are disposed in several places of the vehicle in distributed manner, the communication performance of the whole of vehicle UEs may be improved. Here, the antenna may be an antenna that has radiation patterns of various shapes.

In addition, a central unit (CU) 602 may be installed on the vehicle. In this case, the CU 602 may control a transmission and reception of signals of the antennas distributed throughout the vehicle.

Hybrid Beamforming

The conventional beamforming technique that uses a multiple antenna may be distinguished to analog beamforming technique and digital beamforming technique according to the position of applying beamforming weight vector/precoding vector.

The analog beamforming technique is a beamforming technique applied to an early multiple antenna structure.

This may mean a technique of dividing the analogue signal in which digital signal processing is completed to multiple paths and forming a beam by applying Phase-Shift (PS) and Power Amplifier (PA) configuration for each path.

For analog beamforming, it is required a structure for the PA and the PS to process an analogue signal derived from a single digital signal.

In other words, in an analogue terminal, the PA and the PS process a complex weight.

Figure 7:
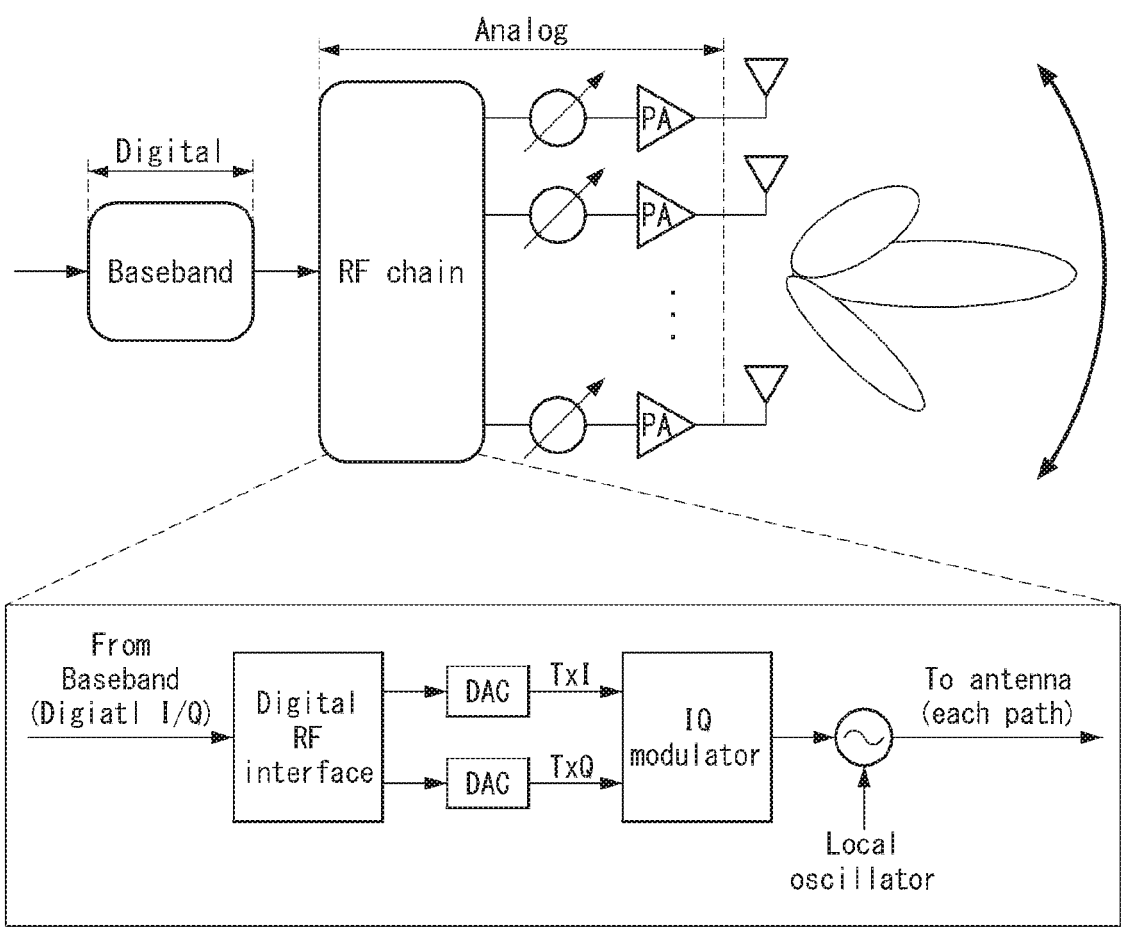
FIG. 7 illustrates an example of a block diagram of a transmitter including an analog beamformer and an RF chain according to various embodiments of the present invention.

FIG. 7 illustrates an example of a block diagram of a transmitter including an analog beamformer and an RF chain according to various embodiments of the present invention. FIG. 7 is shown just for the convenience of description but does not limit the scope of the present invention.

Here, the RF chain means a processing block in which a baseband (BB) signal is transformed to an analogue signal.

In the analog beamforming technique, an accuracy of beam is determined according to the properties of devices of the PA and the PS, and the analog beamforming technique may be advantageous in a narrowband transmission due to the control properties of the devices.

In addition, the analog beamforming technique is constructed with a hardware structure hard to implement multiple stream transmission, and multiplexing gain for increasing transmission rate is relatively small.

Furthermore, in this case, it may be not easy to form a beam for each UE based on orthogonal resource allocation.

Different from this, in the digital beamforming technique, to maximize diversity and multiplexing gain in MIMO environment, a beamforming is performed in a digital terminal by using the BB process.

Figure 8:
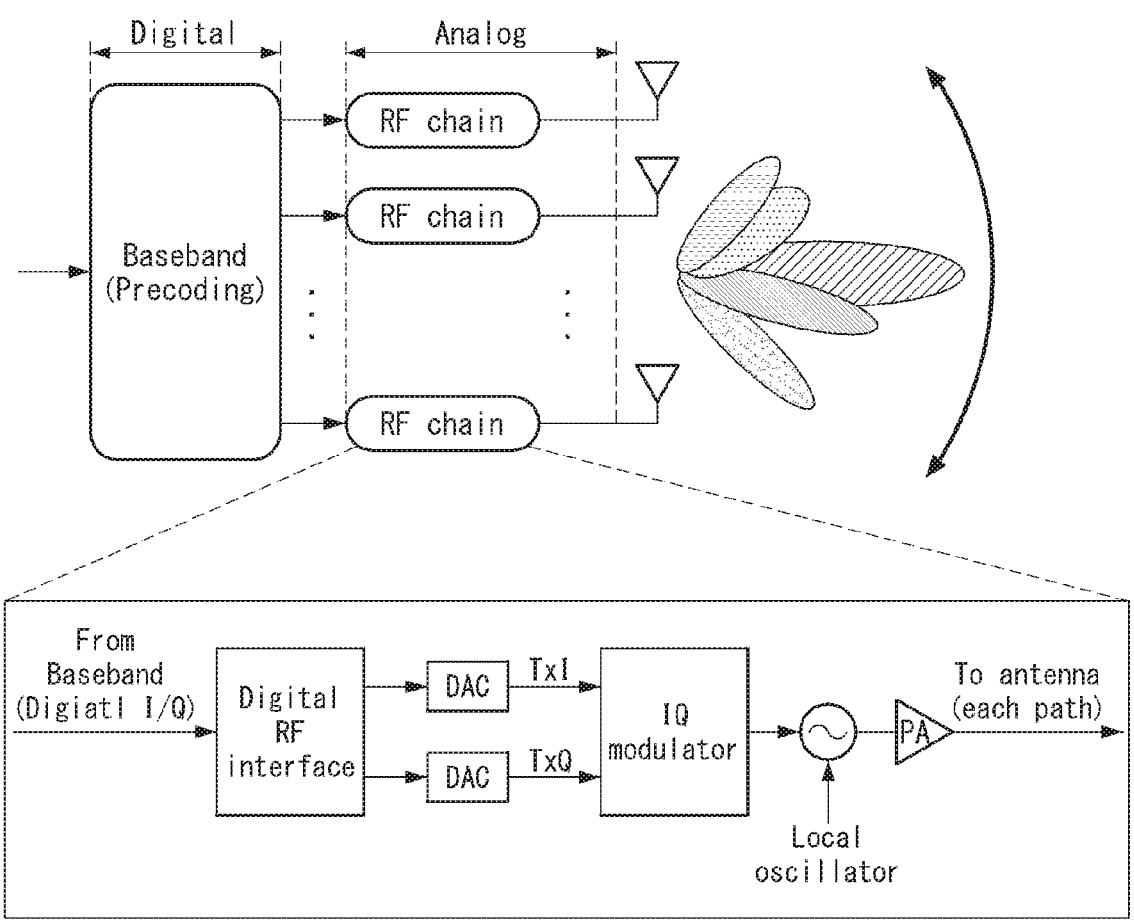
FIG. 8 illustrates an example of a block diagram of a transmitter including a digital beamformer and an RF chain according to various embodiments of the present invention.

FIG. 8 illustrates an example of a block diagram of a transmitter including a digital beamformer and an RF chain according to various embodiments of the present invention. FIG. 8 is shown just for the convenience of description but does not limit the scope of the present invention.

Referring to FIG. 8, a beamforming may be performed as a precoding is performed in the BB process.

Here, the RF chain includes the PA. This is because the complex weight derived for beamforming is directly applied to transmission data, in the case of the digital beamforming technique.

In addition, since different beamforming may be performed for each UE, it may be supported multiple user beamforming simultaneously.

Furthermore, since independent beamforming is available for each UE to which orthogonal resource is allocated, a flexibility of scheduling is improved, and accordingly, the operation of transmitter is available in accordance with a system purpose.

In addition, in the case that a technique such as MIMO-OFDM is applied in the environment that supports broadband transmission, an independent beam may be formed for each subcarrier.

Accordingly, the digital beamforming technique may maximize the maximum transmission rate of a single UE (or user) based on the capacity increase of the system and the enforced beam gain.

Based on the properties described above, in the conventional 3G/4G (e.g., LTE(-A)) system, MIMO technique based on the digital beamforming is introduced.

In the NR system, the massive MIMO environment may be considered, in which the number of transmission and reception antennas is greatly increased.

Generally, in the cellular communication, it is assumed that the number of maximum transmission and reception antennas applied to the MIMO environment is 8.

However, as the massive MIMO environment is considered, the number of transmission and reception antennas may be increased to a few scores or a few hundreds.

In this case, when the digital beamforming technique described above is applied to the massive MIMO environment, a transmitter needs to process signals for antennas of a few hundreds through the BB process for digital signal processing.

Accordingly, the complexity of signal processing may be greatly increased, and since the number of RF chains is required as much as the number of antennas, the complexity of hardware implementation may also be greatly increased.

In addition, in the transmitter, an independent channel estimation is required for all antennas. Furthermore, in the case of the FDD system, the transmitter requires the feedback information for massive MIMO channels including all antennas, pilot and/or feedback overhead may be significantly increased.

However, when the digital beamforming technique described above is applied to the massive MIMO environment, the hardware complexity of the transmitter is relatively low.

On the contrary, the degree of increase of the performance using multiple antennas may be very small, and the flexibility of resource allocation may become lower. Particularly, in broadband transmission, it is not easy to control a beam for each frequency.

Accordingly, in the massive MIMO environment, not only one of the analogue beamforming and digital beamforming techniques is selected exclusively, but it is required a transmitter configuration of hybrid form in which the analogue beamforming and digital beamforming structures are combined.

Figure 9:
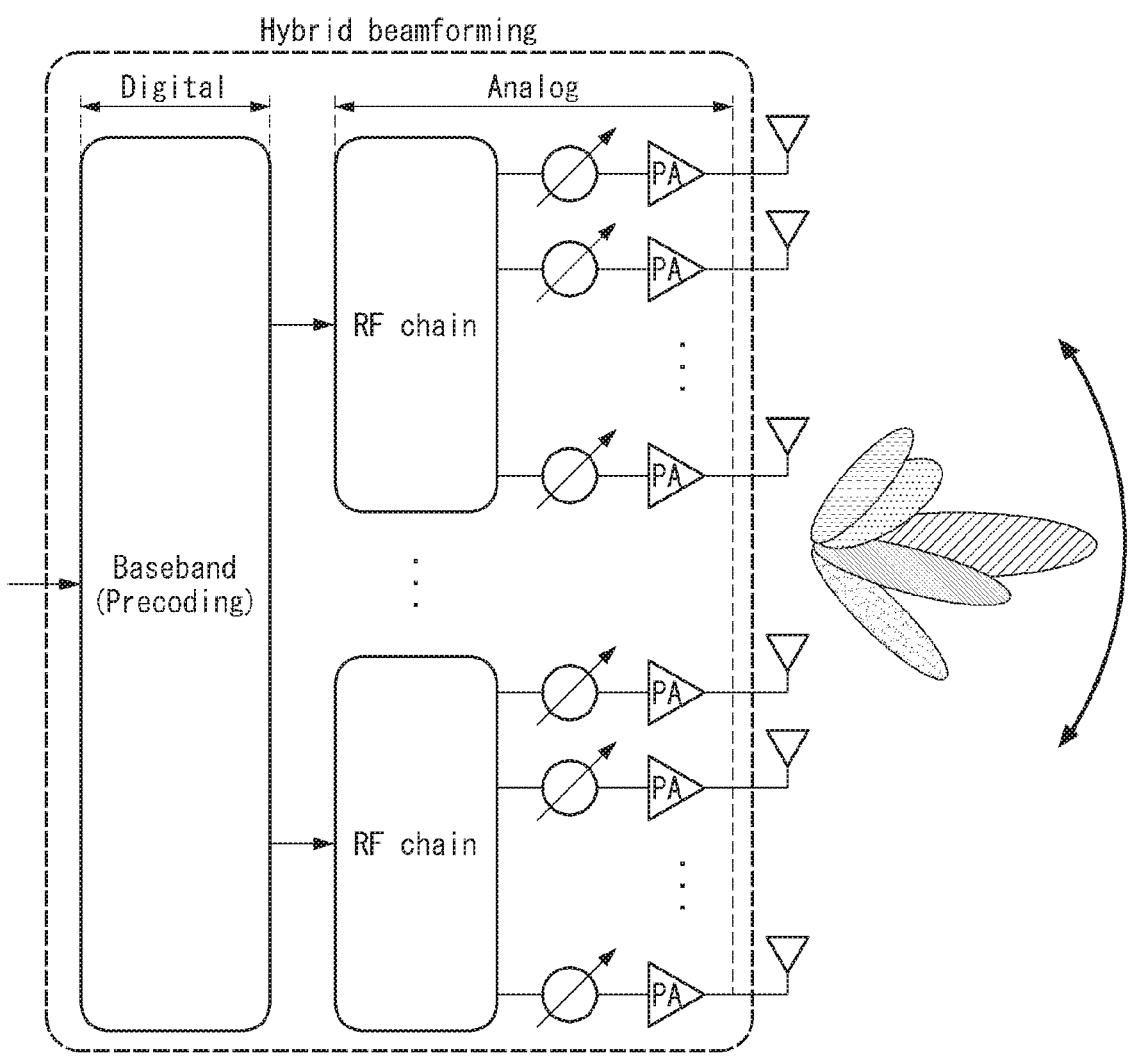
FIG. 9 illustrates an example of a block diagram of a transmitter including an analogue beamformer and a digital beamformer according to various embodiments of the present invention.

In this case, a transmitter of the hybrid form may be constructed by using the relation between the performance gain and the complexity of the analogue beamforming technique and digital beamforming technique as represented in Table 3 below.

ent invention. FIG. 9 is shown just for the convenience of description but does not limit the scope of the present invention.

Referring to FIG. 9, a transmitter may perform a coarse beamforming using the analogue beamforming technique and perform multiple stream and/or multiple user (or UE) transmission using the digital beamforming technique.

That is, the hybrid beamforming may perform beamforming based on the structure that applies the analogue beamforming technique and the digital beamforming technique simultaneously to lower implementation complexity and hardware complexity of the transmitter.

In this case, the technical issues of the hybrid beamforming are as follows.

First, in the case of the hybrid beamforming that considers the analogue and digital beamforming simultaneously, there is a difficulty in implementing an optimized design. Basically, according to the digital beamforming, an independent beamforming technique may be applied to each UE by using the same time-frequency resource, but according to the analogue beamforming, a common beamforming technique needs to be applied by using the same time-frequency resource. Accordingly, such a restriction causes an optimization restriction such as the number of supporting ranks, a flexibility of beam control, a beamforming division, and the like. For example, the maximum number of ranks may be limited according to the number of RF chains, the beam control of sub-band with an RF beamformer may be difficult, and the beam resolution/granularity may be divided.

Second, in the analog beamforming technique, which forms a beam only in a specific direction on the same time-frequency resource, it is not possible to form multiple beams simultaneously in the directions of all UEs. Thus, a problem occurs that an uplink/downlink control channel, a reference signal, a broadcast channel, a synchronization

TABLE 3

|  | Ease of control beamforming accuracy | Multiple carrier beam control | Multiple stream transmission | Hardware complexity (BB process) | Pilot and feedback overhead |
|---|---|---|---|---|---|
| Analogue beamforming technique | Low (related to PA/PS device property) | Impossible or hard | Impossible or hard | Low | Low |
| Digital beamforming technique | High | Possible | Possible | High | High |

That is, based on the relation between the performance gain and the complexity, the transmitter of the hybrid form may be considered (or designed), which may lower the hardware implementation complexity of the transmitter and obtain the beamforming gain using massive antenna to the maximum.

Hereinafter, the technique that the transmitter of the hybrid form forms a beam is referred to as the hybrid beamforming (technique).

As described above, the hybrid beamforming has an object of lower the hardware complexity in the massive MIMO environment and taking the advantages of the analogue beamforming technique and digital beamforming technique.

FIG. 9 illustrates an example of a block diagram of a transmitter including an analogue beamformer and a digital beamformer according to various embodiments of the present signal, and the like, may not be transmitted simultaneously to all UEs that may be distributed over all areas in a cell. In other words, a technique of transmitting a common signal needs to be materialized.

Third, in the case that estimation for analog/digital beams is performed, the digital beam may use the conventional orthogonal pilot allocation scheme without any change, whereas the analog beam requires a time-duration as much as the number of beam candidates. This means that the more time delay is needed for analog beam estimation, and complexity is significantly increased. For example, owing to the time delay, a system loss may be caused.

Fourth, the digital beamforming technique allows to freely form beams for multiple users/streams, whereas, in the analog beamforming technique, the same beam is formed for the entire transmission band, making it difficult to form an independent beam per user or per stream.

Particularly, it may be difficult to support FDMA (e.g. OFDMA) through orthogonal frequency resource allocation, thus the optimization of frequency resource efficiency may be difficult. More particularly, according to the analog beamforming technique, it is difficult to support the multiple access, and it is also difficult to support the single user (SU)-MIMO and the multiple user (MU)-MIMO.

Analog Beam Scanning

For analog beam scanning, an estimation for a single beam may be performed for the same time. Accordingly, the beam training time required for beam scanning is in proportional to the number of entire candidate beams.

As described above, for the analogue beamforming, for a beam estimation in a transmitting and receiving terminal, a beam scanning procedure in the time domain must be required.

At this time, the measurement time $T_s$ for the entire transmission and reception beam may be represented as Equation 1 below.

$$T_S = t_s \times (K_T \times K_R) \quad \text{[Equation 1]}$$

In Equation 1, $T_s$ means a time required for a single beam scanning, $K_T$ means the number of transmission beams, and $K_R$ means the number of reception beams.

Figure 10:
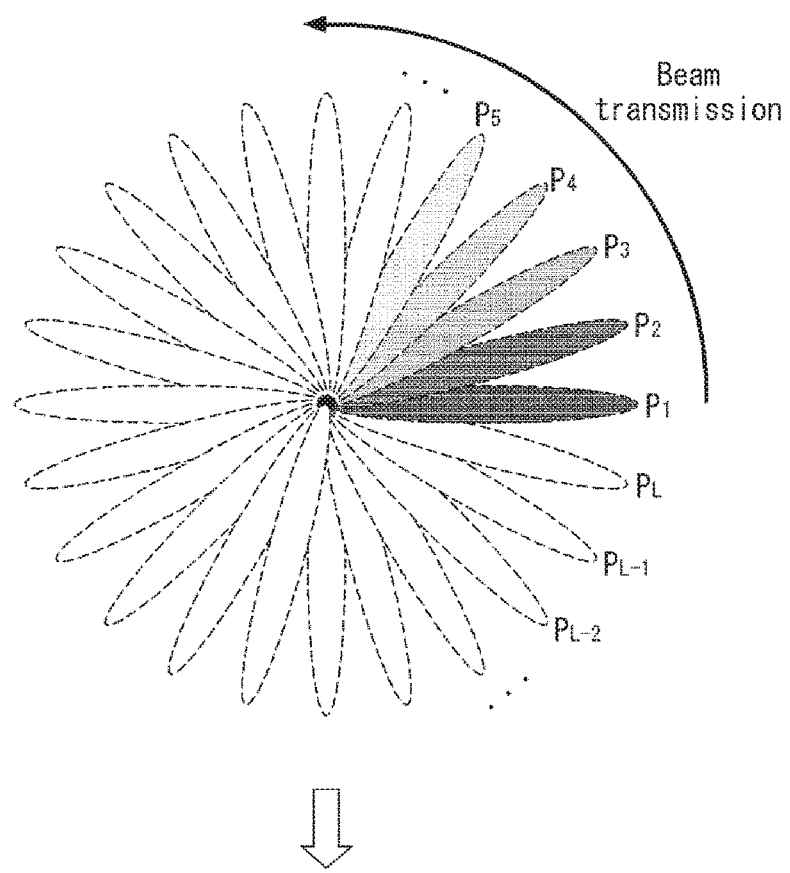
FIG. 10 illustrates an example of an analog beam scanning scheme according to various embodiments of the present invention.
Figure 10:
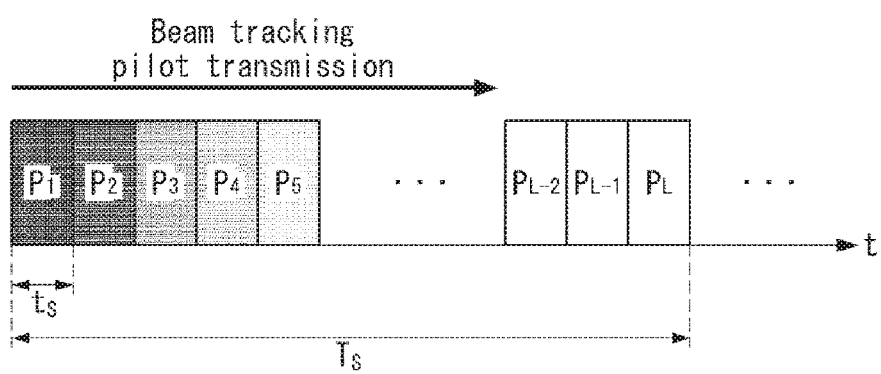

FIG. 10 illustrates an example of an analog beam scanning scheme according to various embodiments of the present invention. FIG. 10 is shown just for the convenience of description but does not limit the scope of the present invention.

In the case of FIG. 10, it is assumed the case that the number $K_T$ of total transmission beams is L, and the number $K_R$ of total transmission beams is 1.

In this case, since the number of total transmission beams is L, L time durations are required in the time domain.

In other words, for the analog beam estimation, only a single beam estimation may be performed in a single time duration, and as shown in FIG. 10, L time periods are required to perform estimation of total L beams ($P_1$ to $P_L$).

After the analog beam estimation procedure is completed, a UE feedbacks an identifier (ID) of the beam that has the strongest signal strength to an eNB.

Hereinafter, it is described a method for a UE to report a transmission (Tx) beam index and/or a reception (Rx) beam index to an eNB proposed in the present disclosure.

As described above, to maximize the performance gain of the massive MIMO, it may be considered a method of disposing a transceiver unit (TXRU) that may control the transmission power and the phase for each antenna element.

In this case, an independent beam forming (or beamforming) may be performed for each frequency resource.

However, it is difficulty in implement to install TXRUs for all antenna element practically.

Accordingly, in the NR system, it may be considered a method of mapping multiple antenna elements to a single TXRU and controlling a direction of beam using an analog phase shifter.

However, in an analog beam, a single beam direction may be set for each time instance (e.g., symbol, subframe, etc.). Accordingly, a beam association between a transmission beam and a reception beam may be inaccurate, and a performance degradation in a transmission and reception may occur in the case that the beam association is inaccurate.

Figure 11:
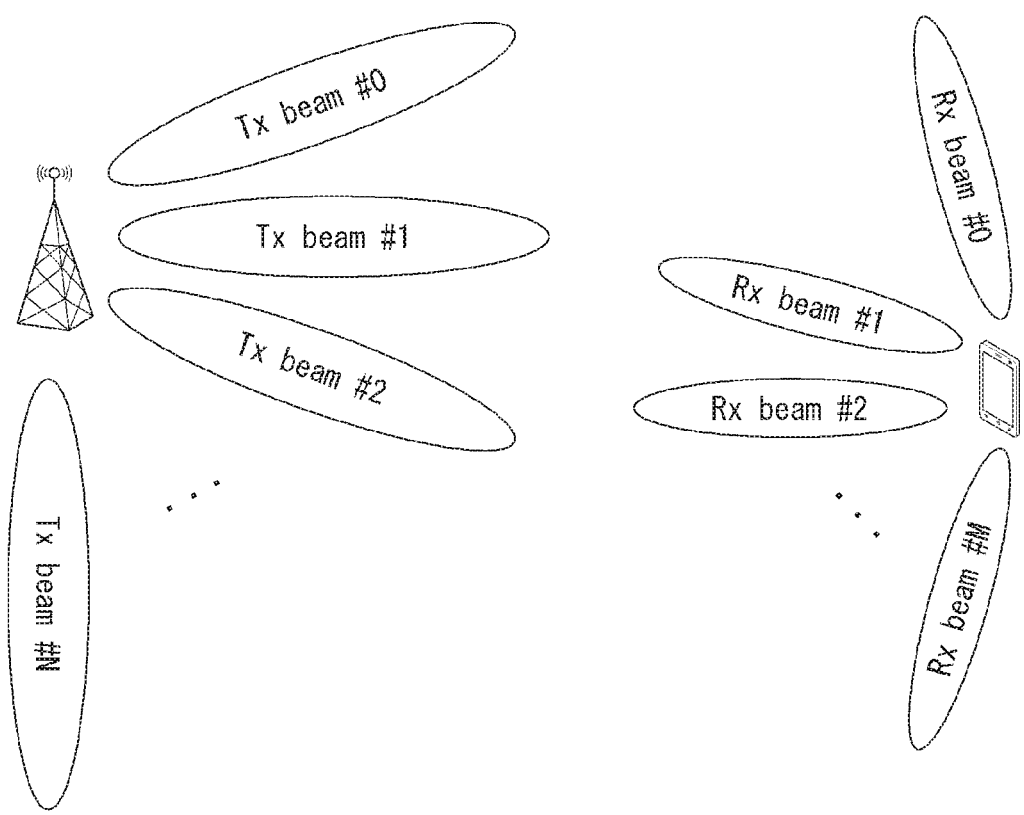
FIG. 11 illustrates an example of a beam configuration between a Tx beam and an Rx beam according to various embodiments of the present invention.

FIG. 11 illustrates an example of a beam configuration between a Tx beam and an Rx beam according to various embodiments of the present invention. FIG. 11 is shown just for the convenience of description but does not limit the scope of the present invention.

Referring to FIG. 11, it is assumed that an eNB forms N transmission beams, and a UE forms M reception beams.

In other words, 'Tx beam#N' means the $N^{th}$ Tx beam formed by the eNB, and 'Rx beam#M' means the $M^{th}$ Rx beam formed by the UE.

For example, in the case that the UE receives a signal using a pair of 'Tx beam#1' and 'Rx beam#1' a pair of 'Tx beam#2' and 'Rx beam#2' from the eNB, the reception performance may be optimized.

In this case, when the UE receives the signal transmitted through 'Tx beam#2'', in the remaining reception beams except the 'Rx beam#2' which is a pair of the corresponding beam, degradation of reception performance may occur.

Particularly, in the case of communication in which a vehicle is used (or vehicle communication), among different distributed antenna units (e.g., radio device or antenna unit) installed on the vehicle or panels in the multiple panel structure, a difference of reception signal quality may occur according to the Tx-Rx beam configuration.

At this time, the difference of reception signal quality may be changed according to a difference of antenna gain and beam pattern, or a difference of location/direction of RU (or panel).

In addition, for the vehicle communication, since a performance robust to a blockage and/or high-speed mobility is requested, the selection and reporting procedure for the Tx-Rx beam is important.

Accordingly, in the present invention, it is proposed a selection and reporting technique for the Tx-Rx beam and a measurement reporting technique for maintaining a robust performance in the vehicle communication.

More particularly, the present disclosure provides (1) a method for grouping an Rx beam, (2) a method for reporting a transmission beam index and/or reception beam index based on the reception beam grouping, and (3) a method for measuring and reporting a beam based on the reception beam grouping, for a UE to report the transmission beam index and/or reception beam index to an eNB.

In the present disclosure, an RU may include a single or multiple physical antenna, and an RU may include a single or multiple antenna port.

In addition, the RU may include only the function of radio frequency module. In this case, the RU may be the same as an antenna panel.

Furthermore, in the case that the RU includes only a single antenna port, the single RU may be the same as a single antenna port.

Of course, the RU may include a part or the whole Layer 1 (L1) function as well as the function of RF module or also include a part of Layer 2 (L2)/Later 3 (L3) function.

In addition, an individual (or single) RU may be considered as an independent Transmission and Reception Unit (TXRXU).

The content and method proposed in the present disclosure is described only for the communication between an eNB and a UE for the convenience of description, but the content and method may also be applied to a reception UE and a transmission UE using a reception beam and a transmission beam/different vehicle transmission UEs/between separate transmission devices.

In addition, the wireless device, the transmission device, the reception device and the transmission and reception device used in the present disclosure may mean a device that may perform at least one of a transmission or reception of a signal, and include a UE, an eNB, and the like.

Furthermore, the vehicle UE used in the present disclosure may mean a mobile or non-mobile device that may perform at least one of a transmission or reception of a signal, and include a UE, an eNB, and the like.

In addition, the wireless device may support a vehicle to everything (V2X) system, and additionally, support a legacy LTE system.

Furthermore, hereinafter, each of the embodiments is distinguished for the convenience of description, but each of the embodiments may be embodied with being combined or embodied independently.

First Embodiment: Rx Beam Grouping

A network may transmit periodically a reference signal to which each of TX beams is applied such that a UE may measure the Tx beams that an eNB is going to use.

Here, the reference signal may include a beam reference signal (BRS).

Accordingly, the UE may perform a measurement for each Tx beam in a time duration (e.g., subframe) in which the BRS is transmitted and select a Tx beam of the eNB which is appropriate for receiving signal based on the measurement.

In addition, in the case that an Rx beam of the UE is considered, the UE may perform a measurement for each Tx beam by using different Rx beams in the time durations in which multiple BRSs are transmitted.

In this case, based on the measurement, the UE may select (or determine) a beam combination(s) in which a Tx beam the eNB and an Rx beam of the UE are considered.

As the procedures described above are performed, a Tx-Rx beam pair may be determined between the eNB and the UE.

Figure 12:
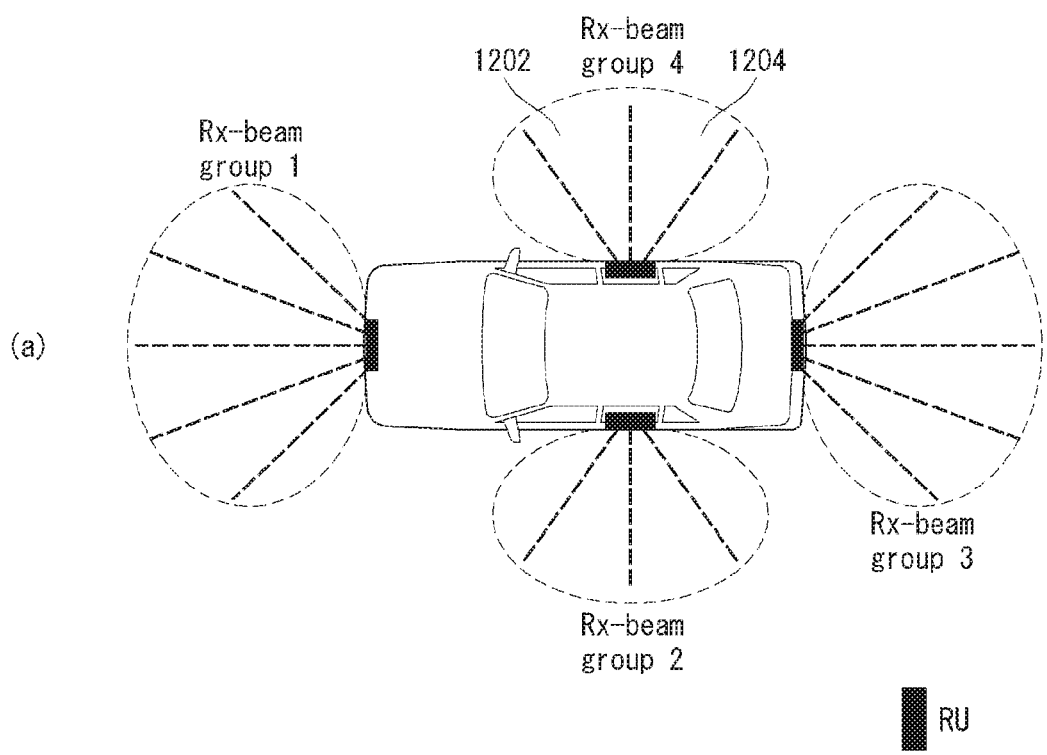
FIG. 12 illustrates an example of an Rx beam group formation according to various embodiments of the present invention.
Figure 12:
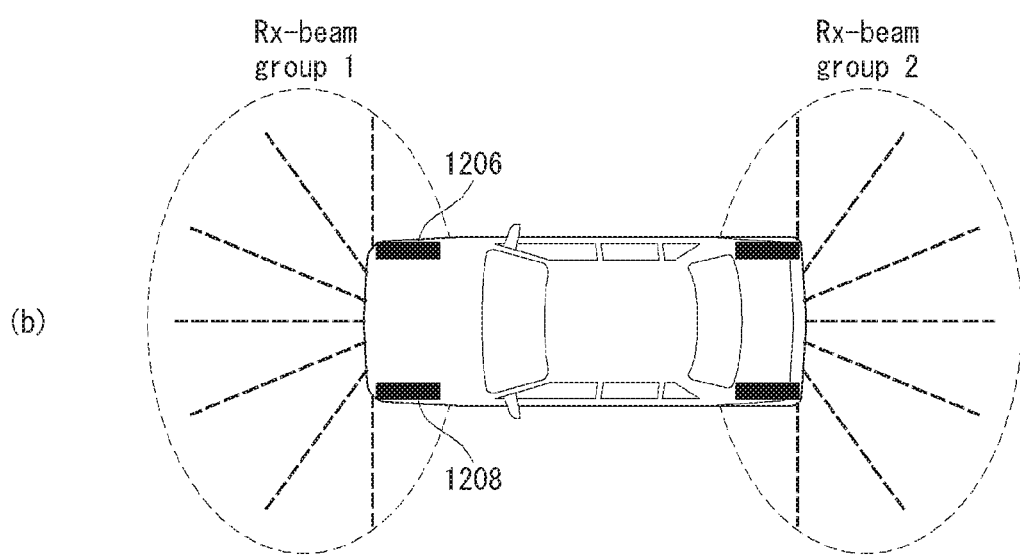
Figure 13:
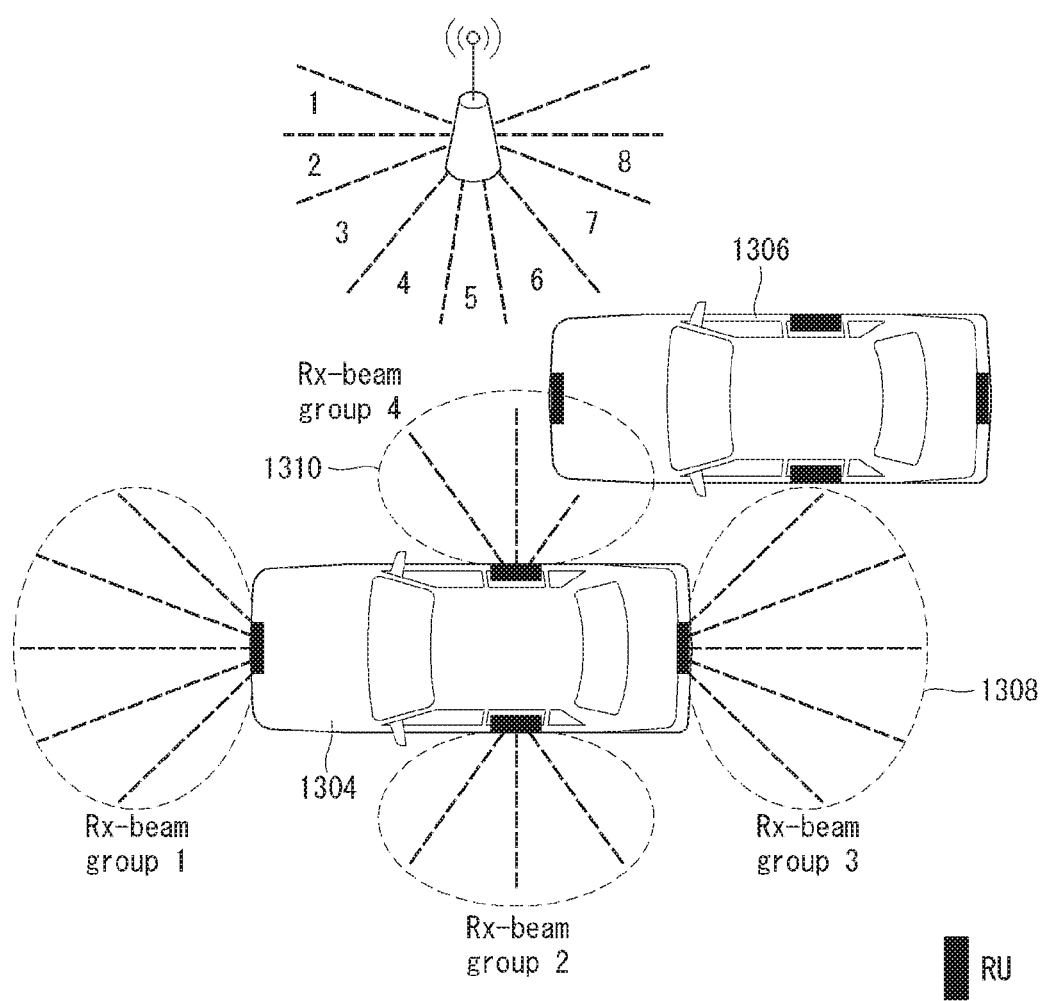
FIG. 13 illustrates another example of an Rx beam group formation according to various embodiments of the present invention.

Meanwhile, as shown in FIG. 12 and FIG. 13, in the case of the vehicle UE, a multi-panel or a UE antenna of RU structure may be disposed.

At this time, in the disposed panel or UE antennas, a resolution of analog beam may be different according to the hardware property.

Accordingly, the Rx beams of the vehicle UE may be grouped according to a unit of RU, a unit of panel, a unit of RU/panel combination or a unit of physical port group of a part of antenna included in RU/panel.

In other words, the Rx beams of the vehicle UE may be grouped to an Rx beam group(s) (or Rx beam set) that has a property of forming a similar Rx beam direction.

Here, the Rx beam group may correspond to a Reception Unit (RXU) (or RU) in one-to-one or one-to-multi manner.

In other words, in the case that the UE includes N RXUs, the UE may form N or less beam groups.

In addition, the beam group may include one or more analog beams.

For example, in the case that the UE includes N TXRXUs, and the analogue beamforming is not applied to each TXRXU, the UE may include N beam groups, and each beam group may include a beam.

For another example, in the case that the UE includes N TXRXUs, and the analogue beamforming is applied to each TXRXU, the UE may include N beam groups, and each beam group may include multiple beams.

FIG. 12 illustrates an example of an Rx beam group formation according to various embodiments of the present invention. FIG. 12 is shown just for the convenience of description but does not limit the scope of the present invention.

Particularly, (a) of FIG. 12 shows an example that a UE forms 4 Rx beam group, and (b) of FIG. 12 shows an example that a UE forms 2 Rx beam group.

Referring to FIG. 12, it is assumed the case that each of the RUs included in the UE has separate TXRXUs, respectively. At this time, the dot line shown in FIG. 12 means a boundary of each beam, and accordingly, the area between dot lines in each group means each (Rx) beam area.

Here, each beam area means a single beam, and it is assumed the case that a single beam group includes 2, 4 or 6 beams. For example, in (a) of FIG. 12, Rx beam group 4 may include a beam 1202 and a beam 1204.

In other words, each Rx beam group may be formed with different number of Rx beams according to the number of RUs, the number of TXRXUs, and/or the number of physical antennas which is configured. In addition, each Rx beam may support different beam resolutions with each other according to the hardware property of the device that forms a beam.

In addition, as shown in (b) of FIG. 12, in the case that multiple RUs have similar beam property, the analog beams formed in the multiple RUs may be formed with a single Rx beam group.

For example, in the case that an RU 1206 and an RU 1208 have similar beam property, the analog beams formed in the RU 1206 and the RU 1208 may be formed with Rx beam group 1 of (b) of FIG. 12.

In addition, between Rx beam groups, totally different Rx beam directions are formed, and totally different large scale (or long-term) channel properties are shown such as a blockage, a path loss, an attenuation, and the like.

FIG. 13 illustrates another example of an Rx beam group formation according to various embodiments of the present invention. FIG. 13 is shown just for the convenience of description but does not limit the scope of the present invention.

Referring to FIG. 13, it is assumed the case that a UE 1304 receives a signal from an eNB 1302 through an Rx beam group.

Here, the UE 1304 may form total 10 Rx beams, and the 10 Rx beams may be grouped into 4 Rx beam groups for each panel based on the channel property distinguished for each UE antenna panel.

For example, for a group 1308 (or Rx beam group 3) or a group 1310 (or Rx beam group 4), the Rx beams belonged to each group have a grouping property which is blocked or opened almost simultaneously according to a movement of the UE 1306.

The Rx beam grouping described above may be performed by a UE or an eNB.

For example, the UE may form the Rx beams having similar channel property values into the same group based on the long-term channel measurement that uses each Rx beam.

For another example, the eNB may transmit coordinated grouping information in the network coordination aspect to the UE. In this case, the eNB may transmit the information through a higher layer signaling or a physical layer signaling.

For example, for indicating formation of the Rx beam group, the eNB may transmit an identifier for the Rx beam group of the UE and/or a control message including at least one field that includes information for a beam index included in the corresponding Rx beam group to the UE.

As described above, in the case that multiple Rx beams are grouped, the UE may perform a beam measurement and reporting for each Rx beam group. Accordingly, the UE may determine an optimal beam combination (transmission beam and reception beam) for each Rx beam group.

Second Embodiment: Reporting Tx Beam Index and/or Rx Beam Index for Rx Beam Group As described above, a UE may group Rx beams and report Tx beam index and/or Rx beam index to an eNB for each Rx beam group.

In this case, the UE may report the Tx beam index and/or the Rx beam index together with the beam group index to an eNB. The beam group index may mean an index that indicates (or represents) each of the Rx beam groups. In the various embodiments of the present invention, the information for the beam group index may be shared between the UE and the eNB and transmitted and received through a higher layer signaling (e.g., RRC signaling).

In addition, the UE may report the information of preferred Tx-Rx beam pair to the eNB based a beam measurement. For example, the UE may report the Tx-Rx beam as a pair, or report only the Tx beam index. Alternatively, the UE may transmit a message including an index for the Tx-Rx beam pair to the eNB. More particularly, based on the beam measurement, the UE may transmit a control message (or reporting message) including an information field for a Tx beam index and/or an Rx beam index of the UE that corresponds to the Tx beam to the eNB.

Furthermore, based on the beam measurement, the UE may report information (e.g., index of the Tx beam and index of the Rx beam, or index for the Tx-Rx beam pair) for the preferred Tx-Rx beam pair of all (or selected a part) Rx beam groups to the eNB.

In this case, the number of Tx-Rx beam pair which is reported for each Rx beam group may be different. In addition, the UE may transmit the information for the number of Tx-Rx beam pairs which is transmitted for each Rx beam group.

At this time, the number of Tx-Rx beam pairs reported to the eNB may be designated in the eNB by a higher layer signaling or based on a predefined (or promised) value between the UE and the eNB.

Alternatively, the number of Tx-Rx beam pairs reported to the eNB may be determined to the best N-beam pair or the number for the whole (or a part) beam pairs satisfying a specific threshold value, based on the measurement result performed in the UE. Here, the specific threshold value may be predefined between the UE and the eNB or may be a value designated by a network.

The procedure for the UE to report the information for Tx-Rx beams (e.g., Tx-Rx beams pair index) to the eNB may be performed periodically and/or aperiodically. Here, whether to report periodically or aperiodically may be configured by a higher layer signaling between the eNB and the UE.

Alternatively, in the case that the measurement result performed by the UE is changed in a degree over a predetermined level in comparison with the result that the UE report previously, the UE may perform an event-triggered reporting to the eNB.

In addition, in the various embodiment of the present invention, when the UE reported the information for Tx-Rx beam for each Rx beam group, the UE may report the information for priority for each Rx beam group together.

For example, the priority may be a priority determined according to a change level of the result that the UE reported previously and the result that the UE measures currently.

More particularly, in the case that an Rx beam group of which link quality of the current measurement result is low is existed in comparison with the result reported by the UE previously, the UE may transmit the reporting for the Tx-Rx beam pair for the corresponding Rx beam group and the information (or information element) indicating that the priority of the corresponding beam group is low together to the eNB.

The eNB may select the Tx-Rx beam efficiently based on the priority received from the UE, and efficient network coordination may be performed.

In addition, the UE may determine the priority for each Rx beam group based on Signal-to-Noise Ratio (SNR) and/or Signal-to-Interference-plus-Noise Ratio (SINR) that the UE measured.

Furthermore, the UE may inform only the information for the priority itself to the eNB by using x-bit flag for the priority. Alternatively, the UE may report SNR and/or SINR value directly to the eNB such that the eNB may determine the priority.

In addition, in the various embodiments of the present invention, after the UE reports the information for the Tx-Rx beam pair for each Rx beam group based on the measurement to the eNB, the UE may operate under the assumption that the eNB transmits a signal by using the Tx beam(s) reported by the UE.

In other words, the UE may perform a preparation procedure to receive a signal using the Rx beam(s) that corresponds to the Tx beam(s) that the UE itself reported to the eNB.

However, the eNB may transmit a signal to the UE by using only a part of the Tx beam index for each Rx beam group reported by the UE or transmit a signal to the UE by using the Tx beam which is not reported from the UE according to a network coordination.

In this case, the eNB may inform the index(es) of the Tx beam that the eNB itself is intended to use for an actual signal transmission to the UE in an implicit or explicit method.

For example, after receiving the reporting for Tx beam index from the UE, the eNB may transmit a control message including the information indicating a beam index that the eNB is intended to use.

For another example, after receiving the reporting for Tx beam index from the UE, the eNB may transmit allocation information for a resource that corresponds to the Tx beam that the eNB is intended to use.

Accordingly, in the case that the eNB transmits a signal by using the Tx beam which is not reported by the UE, it may be prevented the case that a reception performance of the UE is degraded, or signal is not detected.

Figure 14:
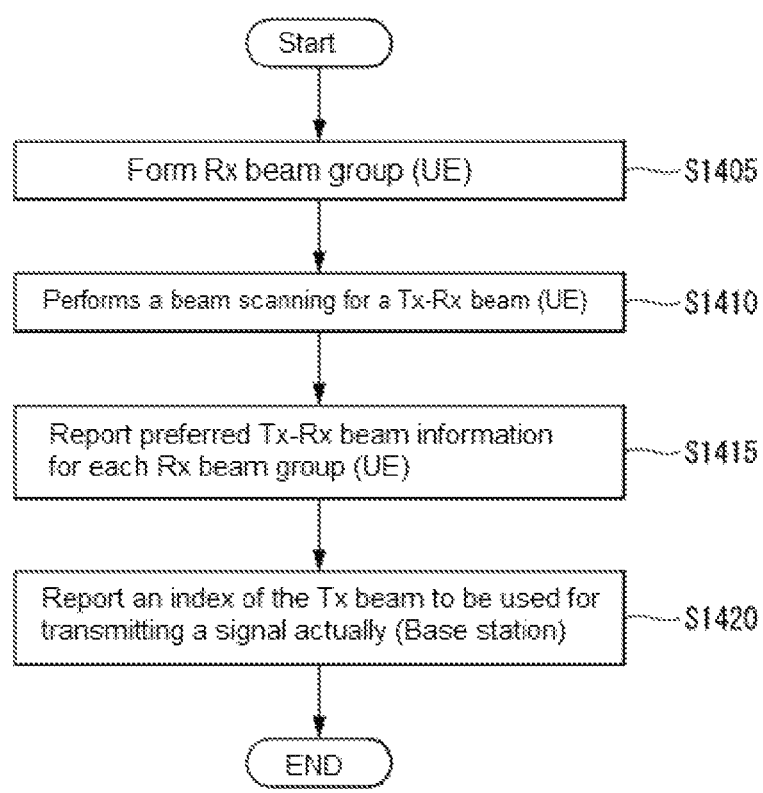
FIG. 14 illustrates an operation flowchart of a procedure for determining Tx-Rx beam used for signal transmission between a UE and an eNB according to various embodiments of the present invention.

FIG. 14 illustrates an operation flowchart of a procedure for determining Tx-Rx beam used for signal transmission between a UE and an eNB according to various embodiments of the present invention. FIG. 14 is shown just for the convenience of description but does not limit the scope of the present invention.

Referring to FIG. 14, it is assumed the case that a UE supports one or beams for communicating with an eNB.

In step S1405, the UE forms at least one Rx beam group (or Rx beam set) based on the one or more beams.

Here, the at least one Rx beam group may include a first Rx beam group and/or a second Rx beam group.

In this case, the at least one Rx beam group may be determined by a scheme of forming beams having similar channel property and/or directivity of similar direction to the same group.

Here, the similar channel property may include long-term channel property.

After the UE forms the at least one Rx beam group, in step S1410, the UE performs a beam scanning for a Tx-Rx beam.

In other words, the UE may perform a beam scanning operation between at least one Tx beam candidate and at least one Rx beam candidate of the eNB.

Here, the beam scanning operation may mean an operation of measuring a channel state for each Tx beam-Rx beam combination using the BRS which is received.

Through this, the UE may compute RSRP, RSSI, and/or RSRQ value.

After the UE performs the beam scanning, in step S1415, the UE reports preferred Tx-Rx beam information for each Rx beam group to the eNB.

In this case, the UE may report an optimal Tx-Rx beam information for each Rx beam group and report one or more preferred Tx-Rx beam information.

Here, the Tx-Rx beam information may include an index for Tx-Rx beam pair, Tx beam index and/or Rx beam index.

In addition, the UE may report the information periodically and/or aperiodically (e.g., event-triggered).

Furthermore, the UE may report the Tx-Rx beam information and the information (flag or index) indicating a priority.

After the UE reports the information to the eNB, in step S1420, the eNB may report an index of the Tx beam to be used for transmitting a signal to the eNB.

In this case, the eNB may report the index of the Tx beam through an implicit or explicit signaling.

Here, the Tx beam may be a beam which is not corresponding to the Tx beam that the UE reports to the eNB. In other words, the eNB may transmit a signal by using different Tx beam, not the Tx beam reported by the UE.

As described above, as the UE report the index of Tx beam and/or the index of Rx beam for each Rx beam group, even in the case that a specific (e.g., specific direction or property) beam (or beam group) is unavailable (e.g., obstacle, antenna device breakdown), the UE may transmit and receive a signal using a beam of different direction.

At this time, since a measurement and reporting are performed for each Rx beam group, a signal may be transmitted and received without performing an additional measurement and reporting due to the unavailability.

Third Embodiment: Measurement and Reporting Based on Rx-Beam Grouping

Hereinafter, it is described a method for a UE to perform a beam measurement based on an Rx beam group and to report the measurement result to an eNB.

In the various embodiment of the present invention, the UE may report the information for Reference Signal Received Power (RSRP) for each Rx beam group to the eNB, as a result of the beam measurement.

At this time, the UE may report the information for Received Signal Strength Indicator (RSSI) or Reference Signal Received Quality (RSRQ) instead of the information for RSRP.

In this case, the beam measurement may be performed by the UE using a reference signal (e.g., BRS) for each Tx beam which is received from the eNB and/or a network.

In the case of the legacy LTE, the RSRP results measured for each antenna port are averaged, and a single RSRP, that is, an average RSRP value is determined, and then, the information for the determined single RSRP value is reported to the eNB.

However, in the case of the vehicle UE described above, according to the unit of configuring an Rx beam group (e.g., RU, panel, antenna group port, etc.), the number of measurement ports for the RSRP measurement may be changed.

Accordingly, in the case that the UE report the RSRP in a unit of Rx beam group, the UE may be required to report the (average for each Rx beam group) RSRP value to the eNB by considering the number of measurement ports.

For example, the UE may report the information (or index) for the number of Rx port (antenna port or measurement port) related to the RSRP measurement to the eNB together with the RSRP value.

Here, the Rx port related to the RSRP measurement may mean the number of Rx ports for each Rx beam group which is used for computing the (average) RSRP value for each Rx beam group.

For another example, in the case that little correlation is existed between the Rx ports, the UE may also report the sum of the measured values in the Rx port(s) included in the Rx beam group as the RSRP of the corresponding Rx beam group.

Figure 15:
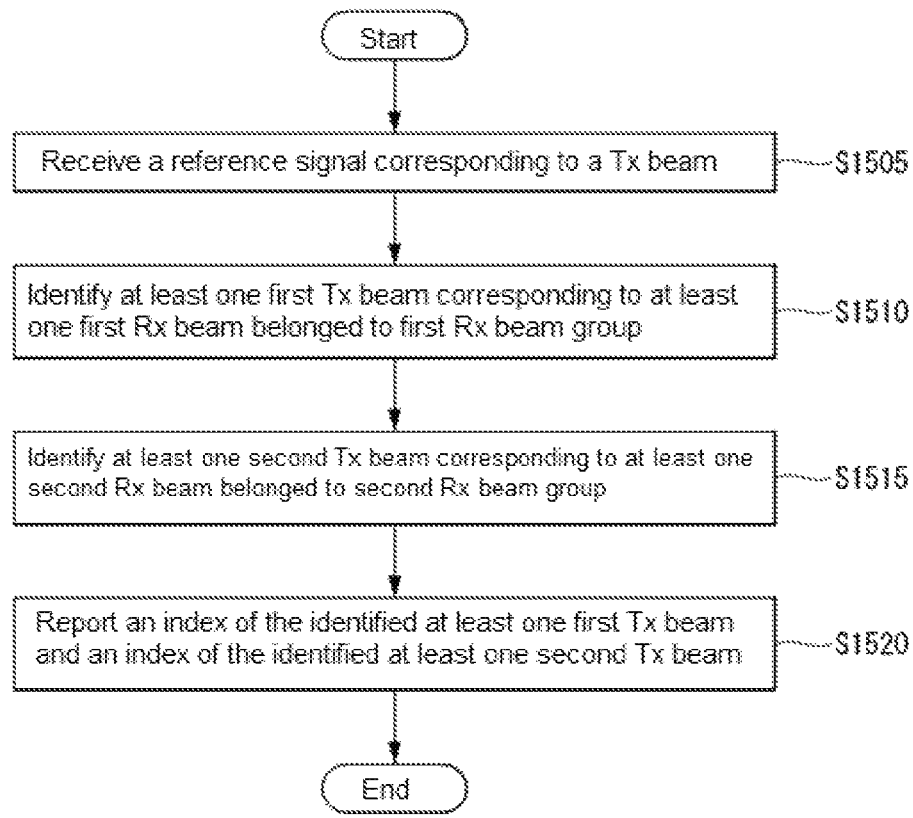
FIG. 15 illustrates an operation flowchart of a UE that reports a beam measurement for each Rx beam group according to various embodiments of the present invention.

FIG. 15 illustrates an operation flowchart of a UE that reports a beam measurement for each Rx beam group according to various embodiments of the present invention. FIG. 15 is shown just for the convenience of description but does not limit the scope of the present invention.

Referring to FIG. 15, it is assumed the case that a UE supports one or more beams for communicating with an eNB.

In addition, the UE and the eNB of FIG. 15 may mean the UE and the eNB in the first embodiment, the second embodiment and the third embodiment.

In step S1505, the UE receives a plurality of reference signals corresponding to a plurality of Tx beams.

In this case, the UE may receive the plurality of reference signals from the eNB and/or a network.

Here, the plurality of reference signals may include a plurality of BRSs.

Later, the UE may perform a beam scanning (or measurement) for a first Rx beam group and a second Rx beam group using the plurality of reference signals which is received.

Here, the first Rx beam group and the second Rx beam group may be determined from a plurality of Rx beams supported by the UE, as described in the part of the first embodiment.

In addition, as described above, the UE may distinguish a group based on a channel property (e.g., Long-term channel property) or a directionality of beam.

After the UE receives the plurality of reference signals, in step S1510, the UE identifies (or selects) at least one first Tx beam based on the measurement performed by using the plurality of reference signals for the first Rx beam group.

Here, the at least one first Tx beam corresponds to at least one first Rx beam which is belonged to the first Rx beam group.

In other words, the UE may select a Tx beam of the eNB for the Rx beam which is belonged to the first Rx beam group through the beam measurement.

In addition, the at least one first Tx beam may mean a Tx beam of the eNB satisfying a high measurement value or a specific threshold value based on the measurement for the first Rx beam group.

Furthermore, in step S1515, the UE identifies at least one second Tx beam based on a measurement performed for the second Rx beam group using the plurality of reference signals.

Here, the at least one second Tx beam corresponds to at least one second Rx beam which is belonged to the second Rx beam group.

In other words, the UE may select a Tx beam of the eNB for the Rx beam which is belonged to the second Rx beam group through the beam measurement.

In addition, the at least one second Tx beam may mean a Tx beam of the eNB satisfying a high measurement value or a specific threshold value based on the measurement for the second Rx beam group.

That is, the UE may divide the first Rx beam group from the second Rx beam group and identify at least one Tx beam to be reported to the eNB.

In addition, step S1510 and step S1515 are sequentially shown only for the convenience of description, but the operations in step S1510 and step S1515 may be performed simultaneously or in reverse direction.

After the UE identifies the Tx beam to report to the eNB, in step S1520, the UE reports each of an index of the identified at least one first Tx beam and an index of the identified at least one second Tx beam to the eNB. The UE may request to use the at least one first Tx beam for the first Rx beam group to the eNB. In addition, the UE may request to use the at least one second Tx beam for the second Rx beam group to the eNB. Here, the meaning of reporting each of an index of the at least one first Tx beam and an index of the at least one second Tx beam to the eNB means to report for each Rx beam group (e.g., for each of the first Rx beam group and the second Rx beam group).

At this time, instead of the index of the at least one first Tx beam, the UE may report a first index pair including the index of the at least one first Tx beam and the index of the at least one first Rx beam. In addition, instead of the index of the at least one second Tx beam, the UE may report a second index pair including the index of the at least one second Tx beam and the index of the at least one second Rx beam.

In the various embodiments of the present invention, each of the number of the indexes of the at least one first Tx beam and the number of the indexes of the at least one second Tx beam may be determined based on configuration information received through a higher layer signaling from the eNB.

In addition, the reporting procedure may be performed periodically or aperiodically.

Furthermore, in the various embodiments of the present invention, the UE may report information indicating a priority for the first Rx beam group and/or the second Rx beam group as described in the second embodiment described above.

That is, the operation of the UE in step S1520 may be similar to the operation of the UE described in the second embodiment described above.

Consequently, the UE may report the index information for a Tx beam for each Rx beam group (i.e., the first Rx beam group and the second Rx beam group) to the eNB.

In addition, in the various embodiments of the present invention, the UE may report the RSRP information for each Rx beam group to the eNB.

For example, the UE may report first RSRP information measured for the first Rx beam group to the eNB and may report second RSRP information measured for the second Rx beam group to the eNB.

At this time, the operation of the UE may be similar to the operation of the UE described in the third embodiment described above.

General Apparatus to which the Present Invention May be Applied

Figure 16:
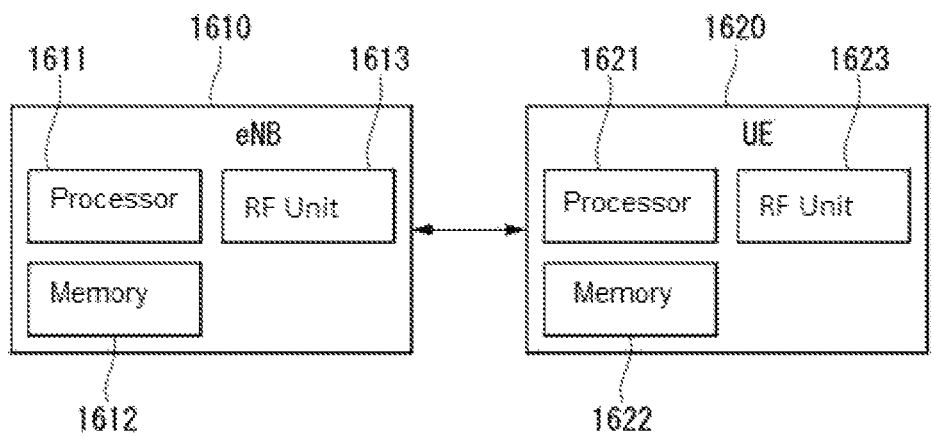
FIG. 16 illustrates a block diagram of a wireless communication apparatus according to an embodiment of the present invention.

FIG. 16 illustrates a block diagram of a wireless communication apparatus according to an embodiment of the present invention.

Referring to FIG. 16, the wireless communication system includes a network node 1610 and multiple UEs 1620.

The network node 1610 includes a processor 1611, a memory 1612, and a communication module 1613. The processor 1611 implements the functions, processes and/or methods proposed in FIGS. 1 to 15. The layers of the wired/wireless interface protocol may be implemented by the processor 1611. The communication module 1613 is connected to the processor 1611 to transmit and/or receive a wired/wireless signal. The memory 1612 is connected to the processor 1611 and stores various types of information for driving the processor 1611. Particularly, in the case that the network node 1610 is a base station, the communication module 1613 may include a radio frequency unit for transmitting/receiving a radio signal.

The UE 1620 includes a processor 1621, a memory 1622 and a communication module (or RF unit) 1623. The processor 1621 implements the functions, processes and/or methods proposed in FIGS. 1 to 15. The layers of a radio interface protocol may be implemented by the processor 1621. The memory 1622 is connected to the processor 1621 and stores various types of information for driving the processor 1621. The communication module 1623 is connected to the processor 1621 and transmits and/or receives a radio signal.

The memory 1612, 1622 may be located inside or outside the processor 1611, 1621 and may be connected to the processor 1611, 1621 by various known means. Furthermore, the network node (in case of base station) 1610 and/or the UE 1620 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method of performing a beam measurement in a wireless communication system of the present invention applied to a 3GPP LTE/LTE-A system is primarily described as an example but may be applied to various wireless communication systems in addition to the 3GPP LTE/LTE-A system.

What is claimed is:

1. A method for performing, by a User Equipment, a beam related reporting in a wireless communication system, the method comprising:
   receiving a plurality of reference signals based on a plurality of beam groups of the UE, and with each beam group comprising one or more beams,
   wherein each of the plurality of beam groups is identified by an index;
   performing a measurement per each of the plurality of beam groups based on the plurality of reference signals; and
   transmitting a beam related report comprising reporting contents corresponding to each of the plurality of beam groups,
   wherein a reporting content for each beam group includes (i) measurement information for each beam group, (ii) the index of each beam group, and (iii) information indicating a transmission (TX) beam corresponding to a reception (RX) beam included in each beam group,
   wherein the measurement information comprises Reference Signal Received Power (RSRP) information measured for each of the plurality of beam groups, and
   wherein the reporting content for each beam group further includes information for a number of antenna ports used for RSRP measurement for each of the plurality of beam groups.

2. The method of claim 1, wherein each of the plurality of beam groups corresponds to a panel equipped to the UE.

3. The method of claim 2, wherein the information indicating the TX beam comprises an index of an optimal TX beam selected per each of the plurality of beam groups based on the measurement.

4. The method of claim 2, wherein the information indicating the Tx beam comprises at least one index pair including an index of the TX beam and an index of the Rx beam.

5. The method of claim 4, wherein a number of the at least one index pair is pre-configured.

6. The method of claim 1, further comprising:
   transmitting information indicating a priority for each of the plurality of beam groups.

7. The method of claim 6, wherein the priority is determined based on at least one of Signal-to-Noise Ratio (SNR) or Signal-to-Interference-plus-Noise Ratio (SINR).

8. The method of claim 1, wherein the beam related report is transmitted periodically or aperiodically.

9. The method of claim 1, further comprising:
   receiving configuration information for the plurality of beam groups,
   wherein each beam group is determined based on the configuration information.

10. A User Equipment for performing a beam related reporting in a wireless communication system, the UE comprising:
    at least one transceiver;
    at least one processor; and
    at least one computer memory connected to the at least one processor and storing instructions that, based on being executed by the at least one processor, perform operations comprising:
       receiving a plurality of reference signals based on a plurality of beam groups of the UE, and with each beam group comprising one or more beams,
       wherein each of the plurality of beam groups is identified by an index;
       performing a measurement per each of the plurality of beam groups based on the plurality of reference signals; and
       transmitting a beam related report comprising reporting contents corresponding to each of the plurality of beam groups,
       wherein a reporting content for each beam group includes (i) measurement information for each beam group, (ii) the index of each beam group, and (iii) information indicating a transmission (TX) beam corresponding to a reception (RX) beam included in each beam group,
       wherein the measurement information comprises Reference Signal Received Power (RSRP) information measured for each of the plurality of beam groups, and
       wherein the reporting content for each beam group further includes information for a number of antenna ports used for RSRP measurement for each of the plurality of beam groups.

11. The UE of claim 10,
    wherein the UE is equipped with multiple panels, and
    wherein each of the plurality of beam groups corresponds to one panel among the multiple panels equipped to the UE.

* * * * *